Patented Apr. 25, 1950

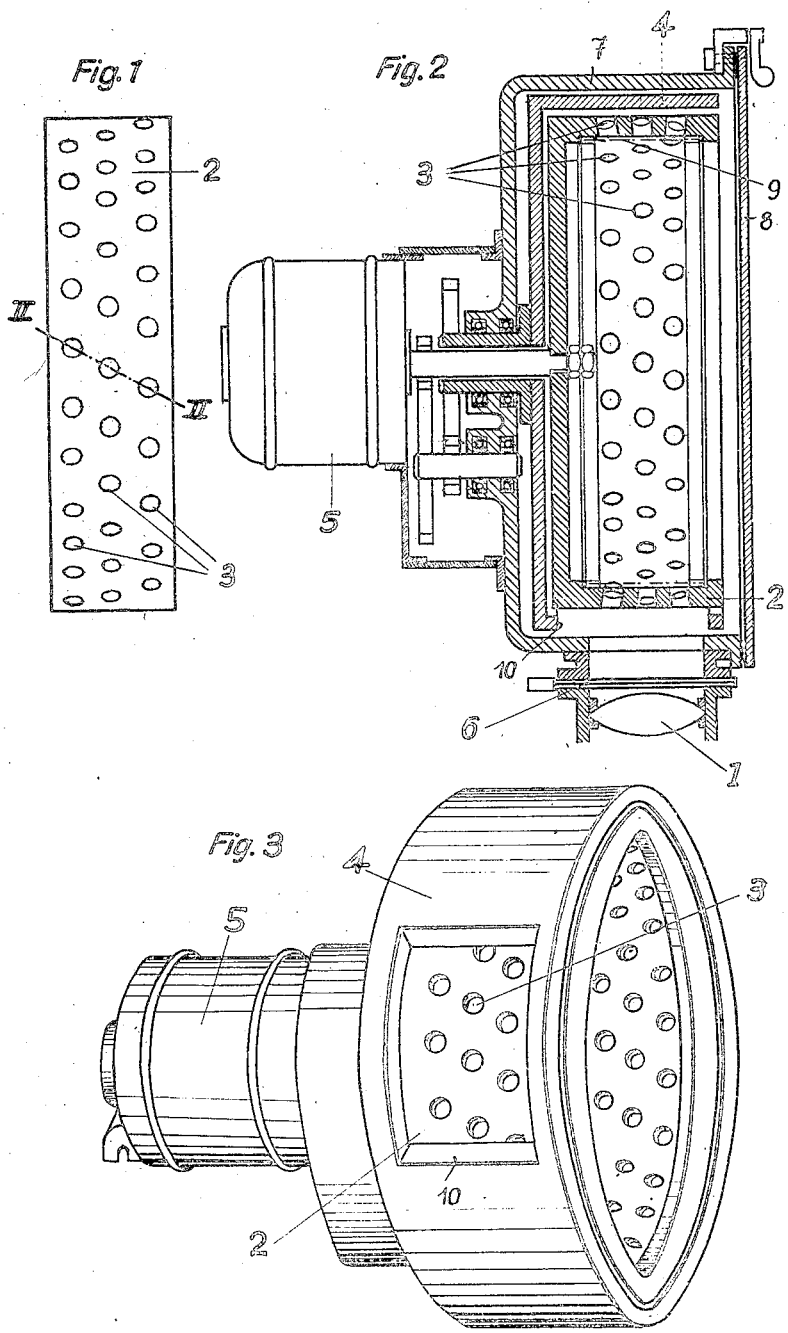

2,505,469

UNITED STATES PATENT OFFICE 2,505,469

CAMERA FOR TAKING ULTRA-FAST MOVING PICTURES

Maurice Gerardin, Grenoble, France, assignor to Société pour l'Exploitation des Brevets M. G. D., Grenoble, France Application May 5, 1947, Serial No. 746,017
In France May 24, 1946

4 Claims. (Cl. 88—16)

As a carrier for the movable in cameras designed for the taking of ultra-fast moving pictures in which the film is fed through continuously, it is well known to use a drum revolved behind a fixed primary lens, the final image resulting from the composition of the primary fixed image formed by said lens with the secondary moving image formed by the secondary movable lenses. Such a camera is described in my Patent No. 2,466,411, issued April 5, 1949, entitled: "Improvements in apparatus for taking cinematographic pictures on continuously fed film."

It is also known to avail one's self for the same purpose of drums carrying several rows of lenses angularly displaced with respect to one another and through each of which a separate image of the subject to be photographed is recorded as the lens moves past the fixed primary lens.

A capital difficulty with such cameras resides in the fact that a certain parallax exists between the said images, due to the lateral offset existing between the various lens rows. With a view to overcome this difficulty cameras have been designed in which the lenses in each row are so arranged that their optical axes shall converge on the subject to be photographed. This however involves the necessity of photographing from an invariable distance from the subject since any deviation from the said distance would involve an increased difference in the parallaxes.

My invention aims at overcoming this difficulty.

It is concerned with improvements in cameras for taking ultra-fast moving pictures in which a rotatable drum is provided on which several rows of lenses angularly offset with respect to one another are mounted.

A first feature of my invention resides therein that a fixed lens system is provided that spans the total width of said rows, the purpose of the movable lenses being to photograph the single primary image formed by said fixed lens system which may be constituted by one single lens or by as many lenses as movable lens rows are provided.

A further feature of my invention resides in the fact that the secondary lenses are so mounted that their optical axes meet at the centre of the primary real image. Where the said primary real image is formed at the geometrical centre of the drum, that is, where its centre coincides with the point of intersection of the optical axis of the fixed primary lens with the axis of rotation of the drum, the optical centres of the movable lenses are to be located on a zone whose centre coincides both with the aforesaid point of intersection and with that of the optical axes of the lenses. Yet, said primary real image may form anywhere else provided the optical centres of the secondary lenses be located on the toric surface generated by the rotation about the axis of the drum of a sphere tangent to a cylinder having a diameter equal to the mean diameter of the drum and whose centre coincides with the point where said primary real image is formed.

According to a further feature of my invention, with the film pressed against the inside of the drum by the effect of the centrifugal force, the possibility of exposing any portion of the film more than once is excluded by the provision of an opaque drum acting as a mask which surrounds the lens-carrying drum and which has an aperture cut therein; said opaque drum is revolved at a speed bearing the same ratio to that of the lens-carrying drum as the angular extent of the aperture to the whole circumference.

That embodiment of my camera for taking ultra-fast moving pictures will be described hereinafter in which the real image is formed at the geometrical centre of the lens-carrying drum; the latter is fitted with three rows of lenses and is surrounded with an opaque drum revolved at a speed eight times less, the angular extent of the aperture therein being 45°, that is, ⅛ of the whole circumference. However, it would remain within the scope of the invention to vary the number of lens rows, the relative speeds of the drums, the arrangement of the parts or the drum-driving means. My invention will be more specifically described by having reference to the appended drawing which however is given for the purpose of exemplification and by no means of limitation.

In the drawing:

Figure 1 is an elevational view of the lens-carrying drum;

Figure 2 is an elevational and partly sectional view of an apparatus according to my invention, the section through the lens-carrying drum being taken on line II—II in Fig. 1 for the sake of convenience in the description;

Figure 3 is a perspective view of the two drums of the camera, the outer casing being removed for the sake of clearness in the drawing.

In the drawing, 1 designates the primary fixed lens, 2 the drum that carries the movable lenses 3, 4 the opaque drum surrounding the drum 2, 10 the aperture in the said opaque drum and 7 the casing of the camera closed by its removable lid 8.

Prior to photographing a film band 9 indicated in chain lines in Fig. 2 and whose length is equal to the circumference of the inside of drum 2 is inserted in the latter; due to the rotational movement imparted to the drum the film band is pressed against the inner periphery of the drum.

For the sake of simplicity the various lenses are represented diagrammatically by simple biconvex lenses; it is to be understood that they may be replaced by any other lens commonly used in cinematographic cameras without thereby departing from the scope of the invention.

The operation of the camera can thus be understood easily. Once said camera is aimed at the subject to be photographed and the drum-driving motor 5 is started and is running at the desired speed, the shutter 6 is opened for no more than the time taken by drum 4 to accomplish one full revolution, which corresponds to eight revolutions of the lens-carrying drum 2. A mechanism of conventional type (not shown) is provided to exclude the possibility for the shutter 6 of opening or closing during the time the aperture in the opaque drum 4 is moving past the fixed lens 1.

As the aperture 10 in the opaque drum sweeps the space behind the fixed lens the image formed by the latter is intercepted successively by a lens in each row.

It follows that during the time the field of the fixed lens 1 is cleared by the aperture 10 the lens-carrying drum will accomplish one complete revolution and that consequently the film band 9 within the camera will be exposed over the whole length of the same.

As already pointed out, the lens system may be composed of as many fixed lenses as rows of secondary lenses are present on the drum.

Moreover, it is by no means necessary that the primary real image should form at the geometrical centre of the drum, since it may be formed at any other point provided the secondary lenses have their optical centres located on a toric surface generated by a sphere tangent to a cylinder having a diameter equal to the mean diameter of the drum and having its centre located at the point where the primary virtual image is formed.

What I claim is:

1. In a camera for the taking of ultra-fast moving pictures, in combination, a rotary drum, a film band arranged within said drum, a plurality of lenses mounted in rows on said drum, and a primary lens system arranged in front of said drum and cooperating with the said secondary lenses, the field of the primary lens system covering the total width of the said secondary lenses and adapted to form the primary real image at the geometrical centre of the drum, the centers of the movable secondary lenses being located on a spherical zone whose centre is located on the axis of rotation of the drum, and the said real image being intercepted by the secondary lenses and projected thereby upon the film.

2. In a camera for the taking of ultra-fast moving pictures, in combination, a rotary drum, a film band arranged within said drum, a plurality of lenses mounted in rows on said drum, and a primary lens system arranged in front of said drum and cooperating with the said secondary lenses, the field of the primary lens system covering the total width of the secondary lens rows carried by said drum, to form a primary real image of the subject to be photographed, the centers of the secondary lenses being located on a tore generated by the rotation about the axis of the drum of a sphere which is tangent to a cylinder having as diameter the mean diameter of said drum and whose center is located at the point where the real image is formed, and said real image being intercepted by the secondary lenses and projected thereby upon the film.

3. In a camera for the taking of ultra-fast moving pictures, in combination, a first rotary drum, a film band arranged within said first drum, a plurality of lenses mounted in rows on said first drum, a primary lens system arranged in front of said first drum and cooperating with the said secondary lenses, the field of the primary lens system covering the total width of the said secondary lenses, a second rotary drum acting as a mask surrounding the said first drum in coaxial relation therewith, and an aperture provided in said second rotary drum, the ratio of the peripheral angle of said aperture to the circumference being equal to the speed ratio between the two drums.

4. In a camera for the taking of ultra-fast moving pictures, in combination, a first rotary drum, a film band arranged within said first drum, a plurality of secondary lenses mounted in rows on said first drum, a primary lens system arranged in front of said first drum covering the total width of the said secondary lenses, a second drum acting as a mask surrounding the said first drum in coaxial relation therewith, an aperture provided in said second drum, the peripheral angle of said aperture being equal to the speed ratio between the two drums, and a shutter arranged between said primary lens system and said second drum.

MAURICE GERARDIN.

REFERENCES CITED

The following references are of record in the file of this patent:

UNITED STATES PATENTS

| Number | Name | Date |
|---|---|---|
| 1,488,542 | Heape et al. | Apr. 1, 1924 |
| 1,520,559 | Buchner | Dec. 23, 1924 |
| 2,088,536 | Ryland | July 27, 1937 |
| 2,259,228 | Rankin | Oct. 14, 1941 |

FOREIGN PATENTS

| Number | Country | Date |
|---|---|---|
| 238,973 | Great Britain | Sept. 3, 1925 |